United States Patent [19]

Merlo

[11] 4,043,205
[45] Aug. 23, 1977

[54] MINIATURIZED PRECISION SPEED GYROSCOPE

[76] Inventor: Michele Merlo, Via Domodossola 11, Milan, Italy

[21] Appl. No.: 693,261

[22] Filed: June 4, 1976

[30] Foreign Application Priority Data

Jan. 9, 1976 Italy .................. 19126/76

[51] Int. Cl.² .......................................... G01C 19/20
[52] U.S. Cl. ........................................ 74/5.5; 74/5.7
[58] Field of Search ...................... 74/5 R, 5.5, 5.7

[56] References Cited

U.S. PATENT DOCUMENTS

| 2,945,380 | 7/1960 | Poyce | 74/5.5 |
| 3,236,108 | 2/1966 | Zatsky | 74/5.5 |
| 3,466,934 | 9/1969 | Pinard | 74/5 |
| 3,597,953 | 8/1971 | Schwarzschild | 74/5.5 |

Primary Examiner—Alan Cohan

[57] ABSTRACT

Miniaturized precision speed gyroscope having high stability in time and as the temperature varies and suitable to withstand impacts. Such a gyroscope comprises a motor, the connections of which to the motor windings are provided with connectors, the bushings of which are within the shaft and the pins of which are in the set screws of the shaft. The differential transformer of the gyroscope has only one coil for each of the poles, is provided with a damping device with four crossing plates overlying four holes for adjusting the aperture thereof. The gyroscope contains a silicone liquid, in which three air bells enclosed within three resilient silver caps are immersed.

1 Claim, 5 Drawing Figures

MINIATURIZED PRECISION SPEED GYROSCOPE

This invention relates to a miniaturized precision speed gyroscope.

As well known, a speed gyroscope is an electric machine performing the sole function of providing electrical information and which, as all of the electric machines, has to bedimensioned in accordance with the power to be delivered.

The power for electrical information, when desiring that the latter be represented by a few volts across a resistance of a few thousands of ohms, as occurs in the use range of speed gyroscopes, is in order of a few milliwatts. Accordingly, it will be readily evident that, when rationally implemented, a gyroscope may weigh only a few grams and be of a very small size.

Speed gyroscope, at present known and used, have a weight of about 150 grams and a volume of about 35 cm³. This is a substantial disadvantage, since the weight and overall size thereof are a serious handicap, particularly when such gyroscope are fitted on small planar antennas.

It is the primary object of the present invention to provide a precision speed gyroscope which is as miniaturized as possible and has unique characteristics, such as extreme precision, high stability both in time and with temperature variation, as well as high capability against impacts.

It is another object of the invention to provide a gyroscope of the above outlined character, having simple component parts and which can be readily made and assembled.

These and still other objects are accomplished by a gyroscope comprising a container, on the outer surface of which two prismatic millings are formed, a bottom connected to said container and carrying a moving element by means of a torsion bar fitted with an impact protecting device comprising a ball bearing carried on said bar with a clearance or play between the inner ring and ball crown, two end of stroke stop pins, which can be adjusted from outside and are accomodated within conical seatings in said bottom and provided with stop collars, teeth projecting from said stop pins in the rotational path of teeth projecting, in turn, from said moving element, a differential transformer internally of said bottom and having a plurality of poles with only one coil for each of the poles and with a rotating core secured to said moving element and comprising magnetic cores as circular sectors magnetically independent of one another and half the number of the number of poles in the differential transformer, a motor, the shaft of which is hollow and is secured to said moving element also by hollow set screws, the two connections to the motor windings being provided with two connectors, the bushings of which are located within the shaft and the pins of which pass through said hollow set screws and are connected to a power supply, a damping device comprising four fins secured to the moving element and rotating within four slots provided with four bimetallic plates crossing one another and located two by two in different planes varying the opening of the slot bottom as the temperature varies, a liquid for filling up the free space in said housing or container, and three air bells enclosed within three resilient silver caps immersed in said liquid, the connections between different and interlocked parts of the gyroscope being effected by conical surfaces with stop collars for ensuring both axially and radially accurate and simple positionings.

In order that the structure and characteristics of a gyroscope according to the present invention be more clearly understood, a preferred embodiment thereof will now be described, by way of unrestrictive example and with reference to the accompanying drawings, in which.

Figure 1:
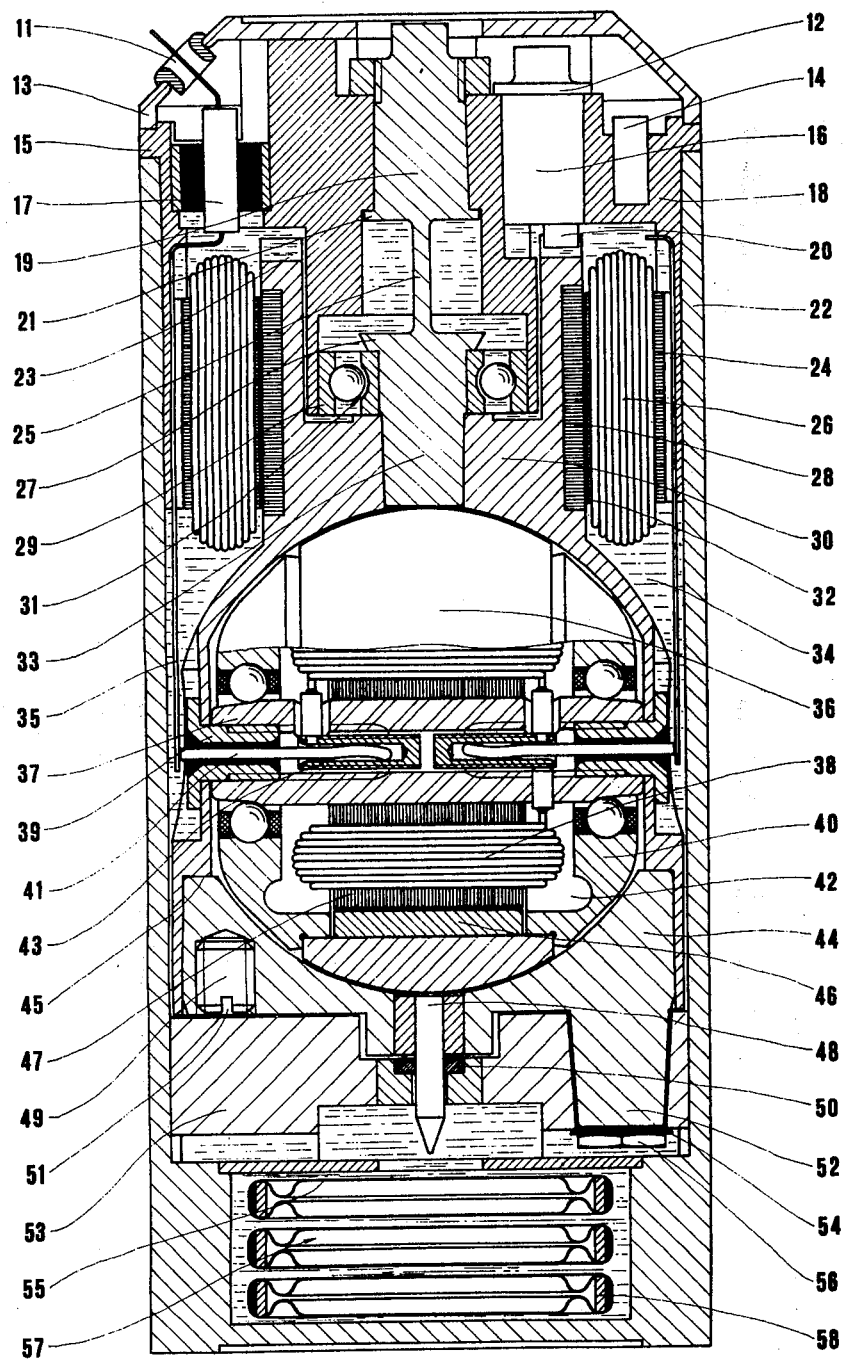
FIG. 1 is a longitudinal sectional view of the gyroscope according to the invention.
Figure 2:
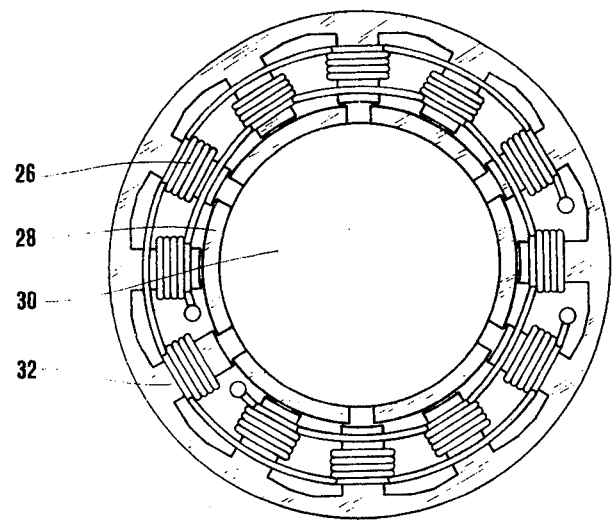
FIG. 2 is a plan view of the differential transformer forming part of the gyroscope.
Figure 3:
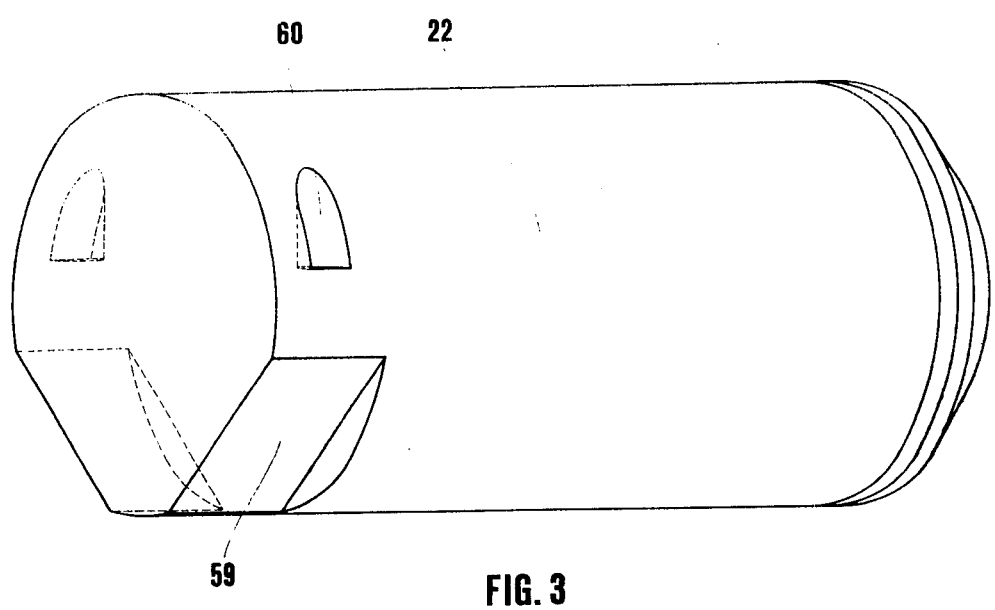
FIG. 3 is a perspective view of the gyroscope housing.
Figure 4:
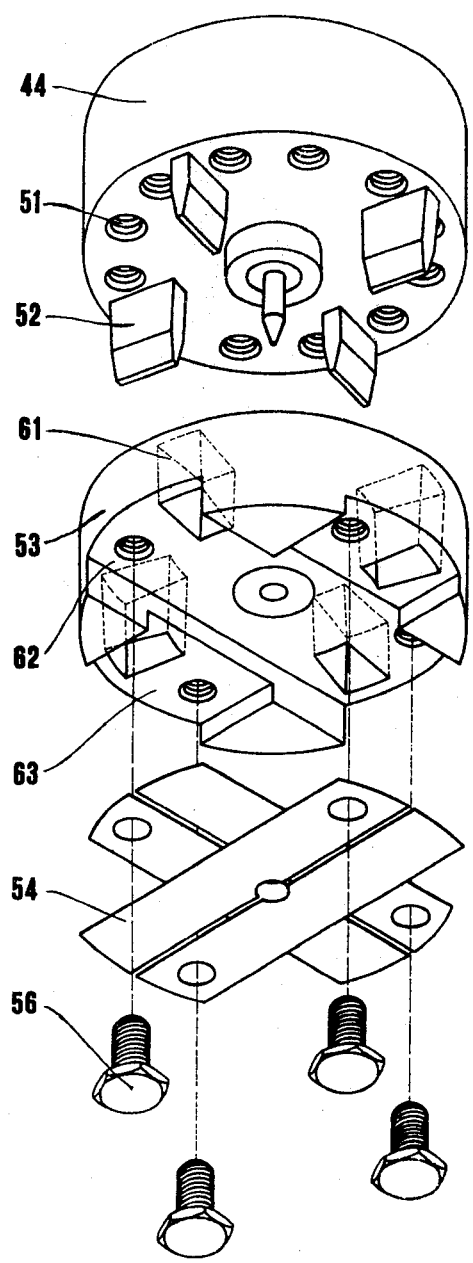
FIG. 4 is an exploded perspective view of the damping device forming part of the gyroscope.
Figure 5:
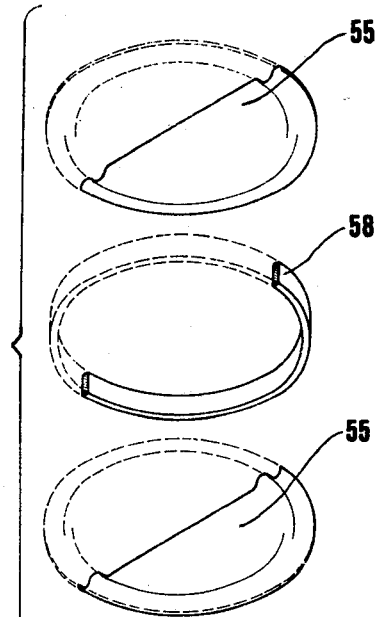
FIG. 5 is an exploded perspective sectional view of a resilient air enclosing silver cap, also forming part of the gyroscope according to the invention.

It should be noted that FIGS. 3, 4 and 5 are shown on a reduced scale relative to FIGS. 1 and 2.

A gyroscope according to the invention comprises a container or housing 22, having mounted and connected thereon a conical bottomm 18, the latter being provided with a stap collar 15. A differential transformer 24 is seated in said conical bottom 18 and has a plurality of poles 32, each of which is provided with only one rigid and geometrically perfect coil 26 and having a rotating core secured to the moving element 30 comprising magnetic cores 28 as circular sectors, magnetically independent of one another and corresponding in number to half the number of poles in the differential transformer.

The bottom 18 has also secured thereto conical and of stroke stop pins 16, each of which is provided with a collar 12 and has projecting teeth 20 located in the rotational path of teeth 23, in turn projecting from moving element 30, the stroke of which is thus defined by adjusting said conical stop pins 16 from outside the gyroscope.

Accomodated within said bottom 18 is a torsion bar 25 fitted wih fastening cones 19 and 33 with stop collars 21 and 27 and having a ball bearing 29 mounted thereon. It should be noted that a clearance or play 31 is provided between the ball crown and the inner ring of bearing 29, due to which said torsion bar 25 is protected against impacts, but without causing any friction during normal operation. Collar 27 of torsion bar 25 is of conical shape of aid in easily removing said bar from moving element 30. The moving element 30 carries a motor 42 comprising a shaft 37, a core 47, a winding 38, a rotor 36, 46, only partially shown in sectional view of FIG. 1, and two ball bearings 40 supporting said rotor on shaft 37.

Shaft 37 of motor 42 is carried and clamped on moving element 30 by two screws 39. The connections to the windings of motor 42 are comprised of two connectors, the bushings 43 of which are insulated internally of hollow shaft 37 and the pins 41 of which are insulated internally of hollow set screws 39. The outer ends of pins 41 are connected through connections 35 to a supply power outside of the motor.

Moving element 30 is carried by bottom 18 through torsion bar 25 and by support or bearing 53 through a pair 48 rotating within a bore drilled within a hard stone 50.

A conical plug 44 is fast or integral with moving element 30 and has stop shoulders 45 and four fins 52 inserted and rotating in slots 61 of support or bearng 53, so as to cause a damping action which by means of four bimetallic plates 54 is maintained substantially constant as the temperature varies. These four bimetallic plates 54 cross in pairs on two intersecting planes 62 and 63 formed in said support or bearing 53, being secured thereto by screws 56, whereby each can freely move, such bimetallic plates performing the function of adjusting the opening of the bottom of four slots 61 as the temperature vaires. Threaded holes 51 in conical plug 44 allow the moving element to be balanced by balancing screws 49.

The gyroscope also comprises equalizing caps 57, each of which includes resilient silver membranes 55 welded to rings 58 and enclosing air. These caps perform the function of equalizing any change in the volume of liquid 34 as the temperature varies, such liquid comprising silicone fluid.

It should be noted that the electrical connections for the gyroscope exit through loops 17 and bushing 11 secured to a cover 13 applied externally of bottom 18, terminal 14 being grounded.

Container or housing 22 has on its outer surface prismatic millings 59 and notches 60, intended to accomodate set screws for enabling fastening thereof on a supporting structure, with an accurate orientation along three axes or directions. This system is simpler and more precise than the system at present used, which restrains the gyroscope position by a pin.

The described gyroscope, has a weight of 40 grams and a volume of 7 cm$^3$ and, under severe tests, showed the capability of enabling such accurate detection as even a few degrees/sec about the inlet axis, while being subjected to disturbance accelerations of thousands of m/sec$^2$ about the drive axis. Thus, it can be stated that such a gyroscope will neglect large disturbance accelerations and will always supply correct information of the speeds applied to the inlet axis.

The basic feature of the gyroscope, that has been described with reference to the appended drawings, is that all of the connections between the several interlocked parts are carried out by conical clamping connections with a stop collar. This allows obtaining accurate positioning both axially and radially. The differential dimensions due to small processing tolerances do not affect the locations of the parts comprising the gyroscope, but only the cone constraints which without any damage can be increased beyond a strictly sufficient minimum rate. It should be noted that this connection system by conical surfaces with stop collars allows the distribution of inner stresses both axially and radially, enhancing the connections in time and with temperature vartiation. Such a simple connection system proved to be by far superior to connection systems obtained by soft soldering currently used extrusively.

Since the differential transformer of the gyroscope has only one rigid and geometrically perfect coil for each of the poles, the gyroscope is further characterized by having a nearly perfect response linearity to the various speeds and a very small "zero" voltage.

As internally of its shaft the motor is provided with two connectors, the gyroscope is further characterized in that the assembling of said motor within the moving element is substantially facilitated and both the two fragile lead wires, that in other gyroscopes exit fixed centrally of the motor shaft, and the weldings of said wires are eliminated, such weldings being capable of contaminating the ball bearings.

It should be noted that preloading of the motor ball bearings is exclusively determined by the size of the flywheel which by a suitable equipment can be selected to the correct size. This eliminates preloading adjustment which at present is provided by turning nuts on the shaft in order to position the inner rings of the ball bearings that are then retained from inwardly moving by the crowns of the balls to the detriment of the latter. Moreover, as the plane of a threaded nut is never at right angles to the axis, clamping is always offset. In the described gyroscope, it is also important to use four shock absorbers (bimetallic plates 54 crossing and cooperating with slots 61 and fins 52) acting in two different planes with openings varying as the temperature varies, allowing the damping factor to be held at a nearly constant rate, which is an improvement over prior art gyroscopes having only two shock absorbers with the bimetallic plates located on the same plane.

Finally, it should be noted that, as the gyroscope is very small and highly compact, a few drops of silicone fluid will suffice to fill the empty spaces thereof, so that the volumetric change thereof is small as the temperature varies. Such a volume change is readily compensated by the three air bells enclosed within three resilient silver caps replacing the cumbersome and expensive bellows currently used.

What I claim is:

1. A miniaturized precision speed gyroscope comprising a housing, on the outer surface of which two prismatic millings are formed, a bottom connected to said housing and carrying a moving element by means of a torsion bar fitted with an impact protecting device comprising a ball bearing carried on said bar with clearance between the inner ring and ball crown thereof, two end of stroke stop pins, which can be adjusted from outside and are accomodated within conical seatings in said bottom and provided with stop collars, teeth projecting from said stop pins in the rotational path of teeth projections, in turn, from said moving element, a differential transformer internally of said bottom and having a plurality of poles with only one coil for each of the poles and with a rotating core secured to said moving element including magnetic cores constituted as circular sectors magnetically independent of one another and half in number as the number of poles in the differential transformer, a motor including a shaft which is hollow and is secured to said moving element by hollow set screws, the two connections to the motor windings being provided with two connectors, including bushings which are located within the shaft and pins which pass through said hollow set screws and are connected to a power supply, a damping device comprising four fins secured to the moving element and rotating within four slots provided with four crossing bimetallic plates, located in pairs in different planes for varying the aperture of the slot bottom as the temperature varies, a liquid filling the free space in said housing, and three air bells enclosed within three resilient silver caps immersed in said liquid, the connection between different and interlocked parts of the gyroscope being effected by conical surfaces with stop collars for ensuring both axially and radially positive and simple positionings.

* * * * *